Figure 1:
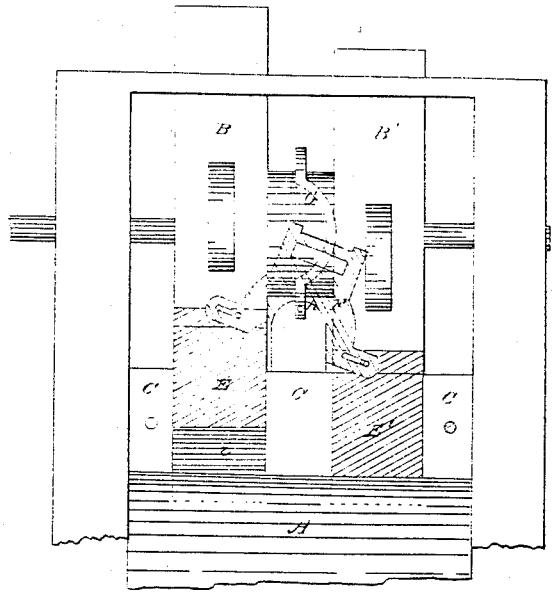
Figure 2:
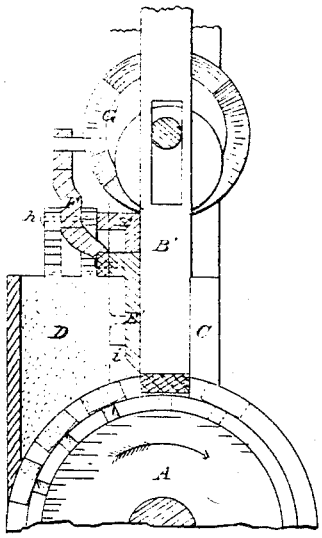

G. Crangle.

BEST AVAILABLE COPY

Brick Machine.

No 154. E.I. Patented Nov. 25, 1856.

Witnesses.
Ben. Morison
R. M. Hall

Inventor.
Geo Crangle

AM. PHOTO-LITHO. CO. N.Y. (OSBORNE'S PROCESS)